(12) United States Patent
Ady et al.

(10) Patent No.: US 9,807,671 B2
(45) Date of Patent: Oct. 31, 2017

(54) APPARATUS AND METHOD FOR OPTIMIZING RESOURCE USAGE WITHIN A GROUP OF COMMUNICATION DEVICES

(71) Applicant: MOTOROLA MOBILITY LLC, Chicago, IL (US)

(72) Inventors: Roger W. Ady, Chicago, IL (US); Eric L. Krenz, Crystal Lake, IL (US); Andrew S. Lundholm, Hoffman Estates, IL (US); Murali Narasimha, Vernon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 28 days.

(21) Appl. No.: 14/800,724

(22) Filed: Jul. 16, 2015

(65) Prior Publication Data
US 2017/0019831 A1    Jan. 19, 2017

(51) Int. Cl.
| | |
|---|---|
| *H04W 40/00* | (2009.01) |
| *H04W 40/22* | (2009.01) |
| *H04W 76/02* | (2009.01) |
| *H04W 72/12* | (2009.01) |
| *H04W 24/08* | (2009.01) |
| *H04W 72/10* | (2009.01) |

(52) U.S. Cl.
CPC ......... *H04W 40/22* (2013.01); *H04W 72/121* (2013.01); *H04W 76/023* (2013.01); *H04W 24/08* (2013.01); *H04W 72/10* (2013.01)

(58) Field of Classification Search
USPC ............................... 370/330, 329; 455/435.2
See application file for complete search history.

(56) References Cited

U.S. PATENT DOCUMENTS

| | | | |
|---|---|---|---|
| 6,553,228 B1 | 4/2003 | Kotzin | |
| 7,024,196 B1 | 4/2006 | Kotzin | |
| 9,125,027 B2* | 9/2015 | Koenig | .................... H04W 4/08 |
| 9,544,861 B1* | 1/2017 | Pais | .................... H04W 76/023 |
| 2010/0002637 A1* | 1/2010 | Huoviala | .......... H04W 72/1247 |
| | | | 370/329 |
| 2011/0055901 A1* | 3/2011 | Karaoguz | ............... G06F 21/10 |
| | | | 726/4 |

(Continued)

OTHER PUBLICATIONS

Wi-Fi Alliance Technical Task Group, Wi-Fi Neighbor Awareness Networking (NAN), Wi-Fi NAN Technical Specification Contribution, Version 0.0 (TG Baseline r16), May 29, 2014, all pages.

(Continued)

*Primary Examiner* — David Q Nguyen
(74) *Attorney, Agent, or Firm* — Cygan Law Offices P.C.; Joseph T. Cygan

(57) ABSTRACT

A method and apparatus for wireless communication device connectivity management includes receiving one or more metrics from at least two members of a group whose members are wireless communication devices. The members of the group have agreed to share resources within the group and have their wireless connections controlled by a wireless connectivity entity. The method and apparatus also includes managing the wireless connections of the at least two members by the connectivity management entity, based on the one or more metrics, to share resources between the at least two members.

23 Claims, 7 Drawing Sheets

(56) References Cited

U.S. PATENT DOCUMENTS

| | | | | |
|---|---|---|---|---|
| 2011/0055935 A1* | 3/2011 | Karaoguz | ............... | G06F 21/10 |
| | | | | 726/29 |
| 2013/0265984 A1* | 10/2013 | Li | ....................... | H04B 7/2656 |
| | | | | 370/330 |
| 2014/0143841 A1* | 5/2014 | Karaoguz | ............... | G06F 21/10 |
| | | | | 726/4 |
| 2014/0370893 A1* | 12/2014 | Srikrishna | ............. | H04W 48/02 |
| | | | | 455/435.2 |
| 2016/0278143 A1* | 9/2016 | Akhtar Masoom Akhtar | .................. | H04W 84/12 |
| 2017/0017608 A1* | 1/2017 | Pais | ..................... | G06F 15/173 |

OTHER PUBLICATIONS

Jian Qiao et al.: "Enabling Device-to-Device Communications in Millimeter-Wave 5G Cellular Networks," Millimeter-Wave Communications for 5G, IEEE Communication Magazine, Jan. 2015, all pages.

Moshsen Nader Tehrani, et al.: "Device-to-Device Communication in 5G Cellular Networks: Challenges, Solutions, and Future Directions", 5G Wireless Communications Systems: Prospects and Challenges, IEEE Communications Magazine, May 2014, all pages.

* cited by examiner

500

505 SELECT, FOR A FIRST MEMBER, A FIRST INTERNET ACCESS POINT OF ONE OR MORE INTERNET ACCESS POINTS, WHEREIN THE FIRST INTERNET ACCESS POINT IS DETERMINED BASED ON THE METRICS RECEIVED FROM AT LEAST THE FIRST MEMBER AND AT LEAST ONE OTHER MEMBER

510 DIRECT THE FIRST MEMBER TO MAKE A WIRELESS CONNECTION TO THE FIRST INTERNET ACCESS POINT AND SET UP AN INTERNET CONNECTION.

605 DIRECT THE FIRST MEMBER TO ESTABLISH ONE OF A DIRECT WIRELESS CONNECTION BETWEEN THE FIRST MEMBER AND THE INTERNET ACCESS POINT AND A MEMBER-TO MEMBER CONNECTION TO A SECOND MEMBER OF THE GROUP THAT HAS AN INTERNET CONNECTION TO THE INTERNET ACCESS POINT

FIG. 6

700

705
DIRECT AT LEAST TWO MEMBERS TO EACH ESTABLISH A DIFFERENT INTERNET CONNECTION OVER WIRELESS CONNECTIONS, WHEREIN THE INFORMATION THAT IS COMMUNICATED OVER THE DIFFERENT INTERNET CONNECTIONS IS COMBINED BY ONE OF THE AT LEAST TWO MEMBERS AND USED BY AT LEAST ONE MEMBER OF THE GROUP FOR INTERNET COMMUNICATIONS

805
DETERMINE THAT A NEW MEMBER HAS JOINED THE GROUP

810
DIRECT THE NEW MEMBER TO MEASURE METRICS FOR CONNECTIONS TO ONE OR MORE INTERNET ACCESS POINTS, BASED ON THE ONE OR MORE METRICS REPORTED BY THE AT LEAST TWO OTHER MEMBERS

*FIG. 8*

900

905
DIRECT A FIRST MEMBER TO MONITOR A FIRST INTERNET ACCESS POINT FOR NOTIFICATIONS FOR A SECOND MEMBER, WHEREIN THE SECOND MEMBER HAS CONNECTIVITY TO A WIRELESS NETWORK

910
DIRECT THE SECOND MEMBER TO ENTER A LOW POWER STATE

1305 — DIRECT A FIRST MEMBER OF THE GROUP TO COMMUNICATE VOICE INFORMATION FOR A SECOND MEMBER OF THE GROUP USING A WIRELESS CONNECTION WITH A FIRST COMMUNICATION NETWORK AND TO COMMUNICATE THE VOICE INFORMATION TO AT LEAST THE SECOND MEMBER OF THE GROUP USING A MEMBER-TO-MEMBER WIRELESS CONNECTION

1405 — RECEIVE A COMMAND FROM A CONNECTIVITY MANAGEMENT ENTITY (CME) TO COMMUNICATE INFORMATION BETWEEN A NETWORK AND A SECOND WCD USING A DIRECT WIRELESS CONNECTION TO THE NETWORK AND AN IDENTIFIED ONE OF A DIRECT AND AN INDIRECT WIRELESS MEMBER-TO-MEMBER CONNECTION TO THE SECOND WCD, WHEREIN THE INFORMATION HAS ASSOCIATED ROUTING INFORMATION THAT IDENTIFIES ONE OF THE NETWORK AND THE SECOND WCD

1410 — ROUTE THE INFORMATION IN ACCORDANCE WITH THE ROUTING INFORMATION, USING THE IDENTIFIED ONE OF DIRECT AND INDIRECT MEMBER-TO-MEMBER CONNECTION FOR COMMUNICATIONS

FIG. 14

APPARATUS AND METHOD FOR OPTIMIZING RESOURCE USAGE WITHIN A GROUP OF COMMUNICATION DEVICES

FIELD OF THE INVENTION

The present invention relates generally to communication devices, and more specifically to reducing resources consumed by communication devices within a group of communication devices.

BACKGROUND

Some communication devices have a capability of communicating in more than one manner, such as by one or more wide area communication networks, by Wi-Fi® RF protocol, and/or by Bluetooth® RF protocol. Some of these are capable of automatically selecting from among the available manners of communication to reduce their resource usage, such as using a Wi-Fi communication link when one is available, which may reduce power consumption and/or data communication costs.

Communication devices are sometimes organized into groups for a variety of purposes. For example, a group may be formed of communication devices that are participating in a cellular phone system provider's family plan, or communication devices that are used by employees in a business.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments. The description is meant to be taken in conjunction with the accompanying drawings in which:

FIG. 5 is a flow chart that shows some steps in managing the wireless connections of the at least two members described with reference to FIG. 3, in accordance with certain embodiments.

FIG. 6 is a flow chart that shows a step used in directing the first member described with reference to FIG. 5, in accordance with certain embodiments.

FIG. 7 is a flow chart that shows a step used in managing the wireless connections of the at least two members described with reference to FIG. 3, in accordance with certain embodiments.

FIGS. 8-10 are each a flow chart that shows some steps used in managing the managing the wireless connections of the at least two members described with reference to FIG. 3, in accordance with certain embodiments.

FIGS. 11-13 are each a flow chart that shows a step used in managing the wireless connections of the at least two members described with reference to FIG. 3, in accordance with certain embodiments.

FIG. 14 is a flow chart that shows some steps of a method used in a first wireless communication device (WCD).

Figure 1:
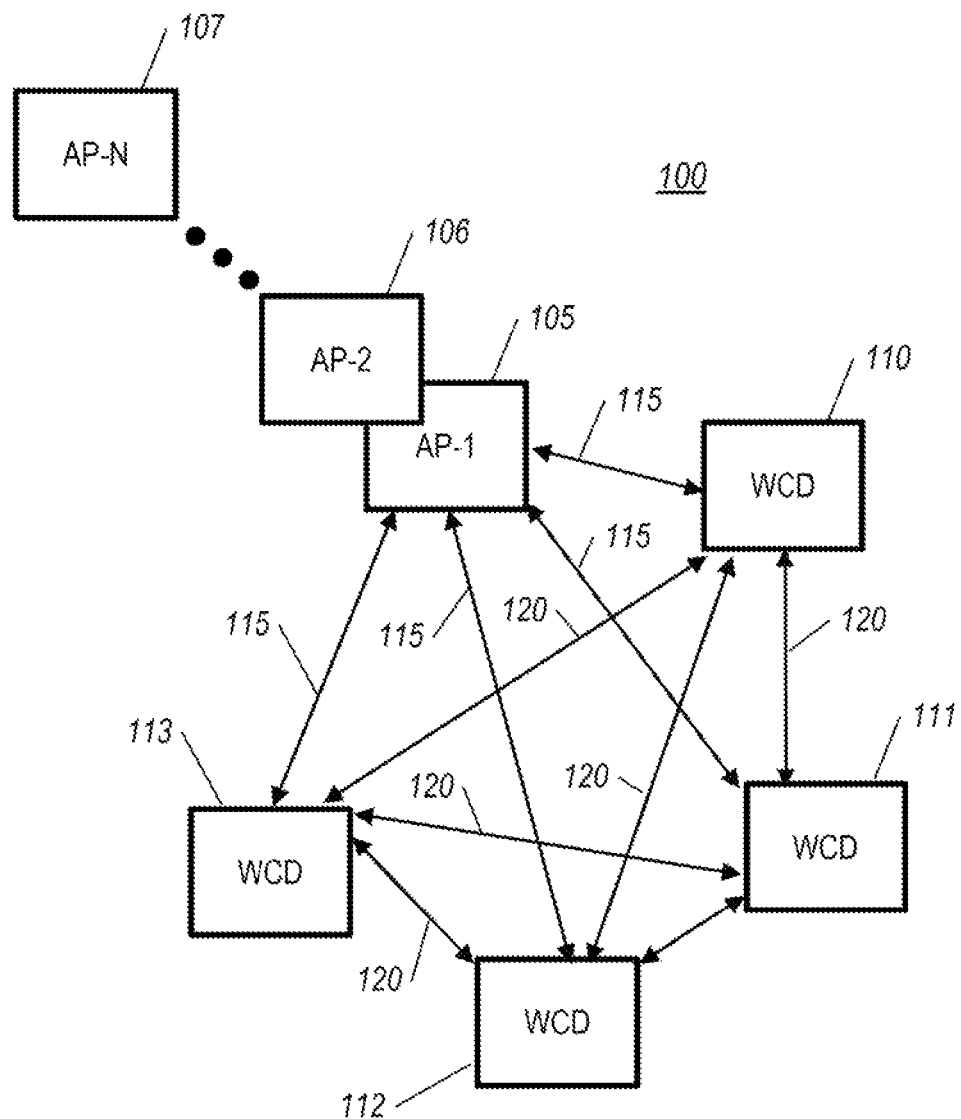
FIG. 1 is a system block diagram that shows a portion of a communication environment, in accordance with certain embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments.

DETAILED DESCRIPTION

In the description below, like reference numerals are used to describe the same, similar or corresponding parts in the several views of the drawings.

Embodiments described herein generally relate to sharing resources within a group of wireless communication devices (WCDs). Generally speaking, a connectivity management entity (CME) is allowed to manage the wireless connections of the WCDs. As just one example, an internet connection that has been established by one of the WCDs by direction of the CME may then be used by other WCDs in the group, using member-to-member wireless connections such as Wi-Fi or Bluetooth that are established under direction of the CME. The CME may reside in one of the WCDs.

It should be apparent to those of ordinary skill in the art that for the methods described herein other steps may be added or existing steps may be removed, modified or rearranged without departing from the scope of the methods. Also, the methods are described with respect to the apparatuses described herein by way of example and not limitation, and the methods may be used in other systems.

In this document, relational terms such as first and second, top and bottom, and the like may be used solely to distinguish one entity or action from another entity or action without necessarily requiring or implying any actual such relationship or order between such entities or actions. The terms "comprises," "including," "having", or any variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a", "includes . . . a, or "having . . . a" does not, without more constraints, preclude the existence of additional identical elements in the process, method, article, or apparatus that comprises, includes, or has the element. The term "coupled" as used herein is defined in the sense that information or energy is passed from one electrical device to another, not necessarily directly, and not necessarily without delay or temporary storage.

Referring to FIG. 1, a system block diagram 100 shows a portion of a communication environment, in accordance with certain embodiments. The communication environment comprises one or more access points 105-107, and some wireless communication devices (WCDs) 110-113 that comprise a portion of the active WCDs that are operating in the communication environment over communication links 115. Each of the access points 105-107 is a wireless node of a network, each of which wireless node can provide a voice and/or internet connection to at least one of the WCDs 110-113. The access points may be, for example, a base station of any cellular system, enterprise system, or a wireless node of a Wi-Fi network. The WCDs 110-113 are a portion of a group of WCDs that are being operated by a group of users. At least some of the WCDs of the group may connect to the access points 105-107 as needed using links 115. Each WCD of the group may be able to connect to access points of other wireless systems. Each WCD may further include member-to-member connection facilities to communicate with other WCDs using one or more of a local area network, for example a Wi-Fi network, or personal area network, for example a Bluetooth network or Near Field Communications (NFC), or a mesh network, for example, a Zigbee® network, or a peer-to-peer capability, such as that being defined for Long Term Evolution (LTE) systems. Each of the WCDs 110-113 of the group or the user of the WCDs of the group have agreed, or agree during execution of the unique techniques described herein, to share resources under the control of a connectivity management entity (CME). The CME comprises an application that is run by one of the WCDs in the group of WCDs, or by a network processing device that is in a fixed network of a wide area network, but is a member of the group of WCDs as a result of having a resource sharing agreement with the other members. Each of the WCDs 110-113 of the group are capable of communicating with the CME, which in some instances may be by using links through another WCD or other WCDs. WCDs 110-113 may be portable, personal, vehicular, mobile, or fixed WCDs. The agreement to share resources by a member WCD is a setting that may represent a legal action taken by the owner of the WCD that is an agreement to share the WCD's resources. In some embodiments, the user of a WCD may have rights to change the setting of the agreement to share or not share. When the CME is within a fixed network, the agreement between a user-owner may appear in the terms of agreement for using the network, and thus may seem to be more implicit than explicit to the user-owner. The owner in some embodiments may not be the user of the WCD. For example, the owner may be a parent of a user or the user may be an employee of a business owner. In this case, the user may or may not be aware of the agreement Generally speaking, the unique techniques described in further detail below provide that wireless connections of each WCD are controlled by the CME. The CME is designed to control the wireless connections of each WCD to optimize resource consumption and performance within the group. In some cases, the resource consumption of one WCD may be decreased while the resource consumption of another WCD is increased. In many cases, the resource decrease may be unnoticeable to the users of the WCDs in the group. The group of WCDs may be of any quantity of WCDs that meet the criteria stated (agreement to have their wireless connections controlled by a CME and share resources).

The resources of mobile and portables WCDs that are typically being optimized are the user's operational cost and the internal resources of power and memory. The usage of these resources may be partially controlled by altering wireless connections. Wireless connections are characterized using communication link metrics such as data rate, quality of service, bandwidth, data limits. The communications metrics may be acquired within communications received by WCDs or acquired by measurements made by WCDs. The acquired communication metrics may be sent to the CME autonomously or on demand These communication metrics are not all independent of each other and not necessarily related to only one of cost and power. For some embodiments, resources are optimized for the benefit of a wide area network operator. The resource that may be most effectively optimized is the bandwidth that is managed by the wide area network operator. The WCD performance that is being optimized for mobile and portable WCDs can typically be related to a quality of service measurement, which may be a metric that is received or which in turn is largely dependent on communication connection metrics such as received signal strength and data rate, which are not independent of each other. Optimization of the resources for the group of WCDs may be accomplished using wireless connection metrics and their known relationship to cost, power and quality of service, or a mixture of the above. The control of wireless connections among the WCDs in a group and the wireless connections between the WCDs and one or more access points is determined by an optimization routine of the CME that monitors and controls the wireless connections, which may change over time, sometimes quickly. Prioritization of the metrics can be based on machine learning, artificial intelligence, and/or user prioritization. Examples of groups and control of the wireless connections to optimize the resources and performance of the group of WCDs follow.

Traffic Cost Optimization Example.

The traffic in these examples is voice or data. The CME optimizes the wireless connections of the WCDs for cost. Metrics that may be used for data cost measurement are communication link metrics such as bytes used, cost per byte, a byte limit (such as a monthly limit), a periodic reauthorization date, an amount used, and history of usage during the period. For voice, the communication link metrics may be minutes used, cost per minute, a minute limit, a periodic reauthorization date, an amount used, and history of usage during the period. Exemplary groups for this type of optimization are groups whose users are on a group plan or whose users have individual plans whose costs are borne by one entity. A family group having a family plan is an example of a group plan. A business plan in which the users submit vouchers or whose costs are billed to a company account are examples of individual plans whose costs are borne by one entity. In both types of groups, one financially responsible entity can benefit from cost optimization. The CME may be resident in any one of the WCDs in the group.

One example of optimization by the CME is to select the WCD of a wide area network user that has excess capacity (bytes or minutes). This may be determined based either on the user having unlimited usage (while another member or members of the group do not have unlimited usage) or on one or more of a traffic limit, a periodic reauthorization date, an imminent expiration date, an amount used, and history of usage during the period to determine one who appears to have excess capacity. The CME then arranges connections for other user's WCDs in the group so that they communicate to and from the wide area network through the selected WCD using a local area network with no traffic costs for the communication between WCDs if device-to-device Wi-Fi is available or if Bluetooth is used, while incurring only the wide area network traffic cost for the selected unit. If a WCD is detected to have a free or unlimited data plan through a Wi-Fi access point (as may be the case if that device has previously established a login with that Wi-Fi access point or an access point on a nationwide network of access points hosted by a restaurant chain, hotel chain, city-wide WiFi plan or the like), then the CME configures that device to provide WAN access for the group at no marginal cost. This management system therefore takes advantage of any and all such plans that each user may have set up access to at some point to then exploit one or more of those free WAN connections to the benefit of all in the group. In a related example, the CME may select the WCD that is operating with a wide area network at the lowest cost per byte as the WCD to provide wide area network connection to other WCDs through local area connections, and change the selected WCD as costs change over time. Costs may change when a user's account goes over a traffic (e.g., bytes or voice minute) limit. In another related example, when a business group is staying at a hotel, the CME could select one user to lease internet access rights for a day and have the user's WCD provide internet connection support for other business members in the group through a no-cost or low cost local area network connection. The CME could control the WCDs to use Bluetooth connections between the WCDs or could initiate a WiFi network using a Wi-Fi hotspot (if so equipped) in any WCD. In lieu of manual notifications or guidance provided by the CME, this scenario might unfold as follows: the first group member to set up service with the hotel hotspot would become the host device and all other nearby devices would connect through it and possibly receive a warning that they are already connected if in fact they too try to establish a connection, at which point they can decide if they want to possibly pay for a redundant connection.

Power Optimization Examples.

In these examples, the CME manages the wireless connections of the WCDs for power optimization. In one example, the metric used is the internal resource status of remaining battery capacity. An exemplary group is a group of WCD users that are in a vehicle for a trip. The vehicle has only one cigarette lighter adaptor available. The CME can select a WCD that has a low or the lowest remaining battery capacity to use the cigarette lighter adaptor (CLA) for power, advise the user of that WCD to connect to the CLA, and control all the WCDs to interconnect to the internet through the CLA connected WCD using a Wi-Fi hotspot of the CLA connected WCD. Thus the CLA connected WCD can become recharged while handling the power consuming wide area network connection and hotspot functions. If and when another WCD becomes low on power, the CME can select it to become the WCD that is connected to the CLA, inform the users to change the CLA connection, and rearrange the internet and Wi-Fi connections. Again, in lieu of manual notifications the CME may simply detect which device is in fact plugged in to the CLA using a charging status metric and then use that device for the WAN connection. In another example, some WCDs are being used only for low data rate functions, such as instant messaging or texting. If the CME is monitoring a data rate metric then it can select another WCD to provide the wide area network connection and configure the selected WCD and the other WCDs in the group to use power-efficient low data rate systems to interconnect, such as low energy Bluetooth. The CME can then shut off the WCD's wide area and Wi-Fi modems to conserve power in a potentially dramatic way.

Quality of Service Examples.

In these examples, the CME manages the wireless connections of the WCDs for quality of service optimization. The metrics for these examples may include communication resource needs, priorities, and limits and communication link parameters. The communication resource needs may include such metrics as desired QoS, minimum QoS, desired data rate, minimum data rate, desired duration, and minimum duration. The priorities may be for any of these metrics. The communication link metrics may include such metrics as current data rate, current duration, current QoS, current signal to noise ratio, current bandwidth. In one example, the CME controls several WCDs to connect over a wide area network simultaneously to combine information from several lower bandwidth connections having a desired quality into one higher bandwidth data stream providing the total information at the desired quality to one or more WCDs in the group over a local area network. In another example the CME dynamically controls the selection of a WCD as the one to interconnect to a wide area network for the group based on a signal to noise value or QoS value in a situation in which the WCDs are operating in a weak signal area of an isolated cell and the positions of the WCDs are changing (in/out of pockets, purses, or placed on metal table, etc.) in ways that significantly affect the received signal strength of the WCDs. In MIMO networks, this approach could be used to select a best connection, including antenna selections, in the MIMO network for one WCD and re-distribute the data being communicated in the MIMO network from the one WCD to other WCDs of the group using Wi-Fi or Bluetooth.

Network Bandwidth.

In these examples, the CME may operate to optimize bandwidth for a wide area network operator in a manner that is unapparent to the group of WCDs. The metrics involved may be bandwidth, QoS, and power. In one example, the CME controls the group of WCDs to use one of them for communicating information for some or all of the group to the wide area network, and sets up a local area network between WCDs in the group of WCDs to distribute the information appropriately. The CME may also shut down the unneeded wide area network modems in the WCDs not needing that connectivity, conserving power in the WCDs. This also may conserve bandwidth over and/or power consumption by the wide area network by reducing interference from the otherwise redundant modems in heavy RF traffic areas, thereby reducing transmit power. In this example, the users of the group of WCDs agree to share resources with the network operator, probably at the time of agreement to subscribe to the network operator's communication services. The CME in these network examples has components that are largely within the fixed network of the wide area network. For purposes of this document and these embodiments, the wide area network is considered a member of the group of WCDs.

It will be appreciated that while the above examples are each generally concerned with one resource, the optimization of resources can involve more than one resource. For example, the selection of the WCD for connection to the vehicle CLA could be combined with the selection of the same WCD or different WCD for connection to a wide area subscriber service to handle internet connection for the other members of the group of WCDs. In this case an optimization algorithm is used that weighs power and cost resource optimization to select the roles for different WCDs.

Figure 2:
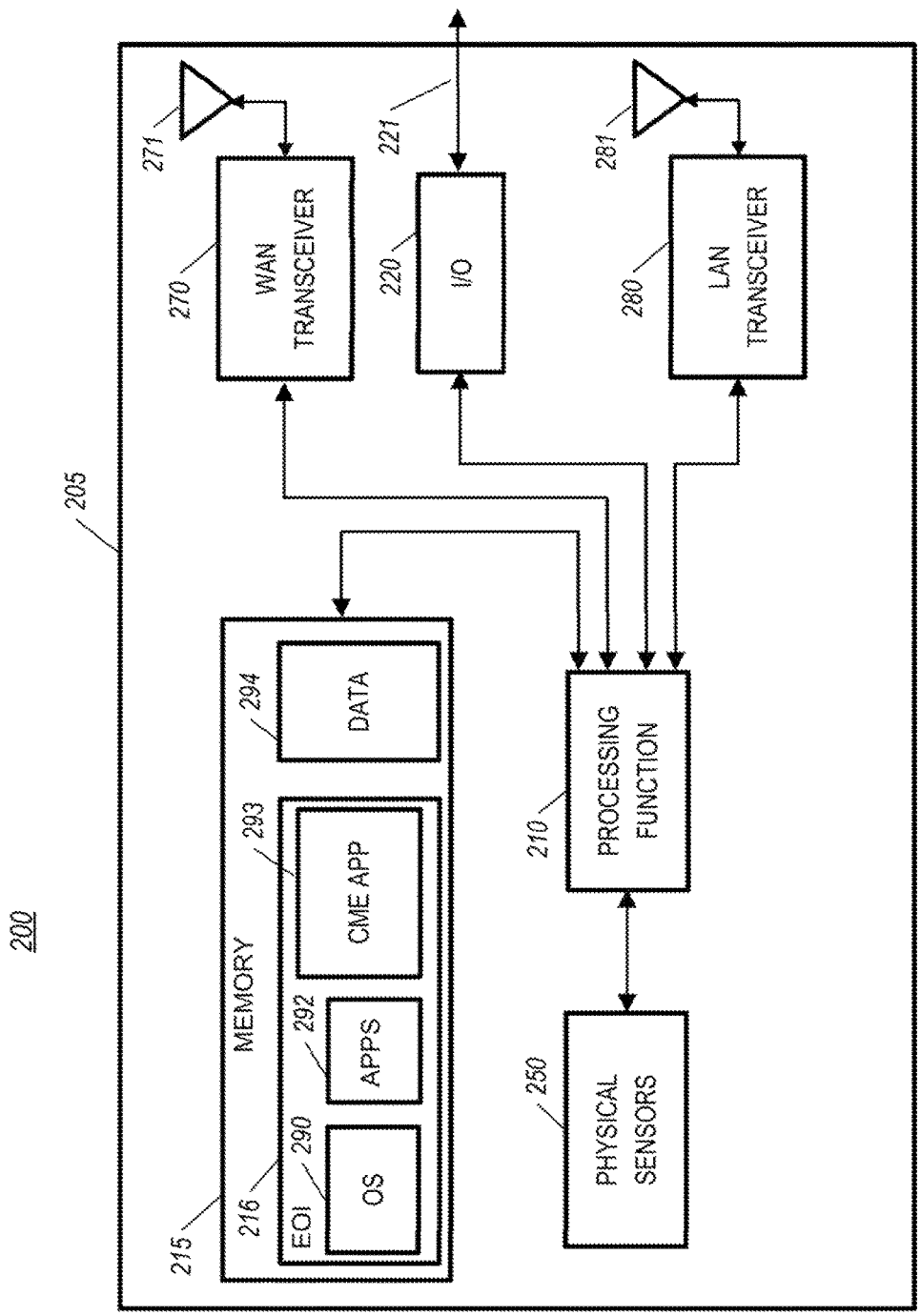
FIG. 2, is a functional block diagram that shows a wireless communication device (WCD), in accordance with certain embodiments.

Referring to FIG. 2, a functional block diagram 200 shows a WCD 205, in accordance with certain embodiments. The WCD 205 includes a processing function 210, a memory 215, input/output interface circuitry 220, and one or more physical sensors 250. The processing function 210 comprises one or more processing devices (not shown in FIG. 1), each of which may include such sub-functions as central processing units (cores), cache memory, instruction decoders, just to name a few. The processing function 210 executes program instructions which may be located within memory in the processing devices or may be located in a memory 215 external to the processing function 210, to which the memory 215 is bi-directionally coupled, or in a combination of both. The memory 215 may be any combination of hardware that stores programming instructions, including RAM, ROM, EPROM, EEPROM, or parts of an ASIC, The processing function 210 may, in some embodiments, be further coupled to a radio wide area network receive-transmit function (also referred to as the radio network transceiver or wide area RF modem) 270 that is coupled to a radio antenna 271, which may be internal or external to the electronic device 205. A second wide area network transceiver may be included (not shown in FIG. 1). The wide area network transceiver or transceivers may be for cellular, enterprise, public safety, or other wide area systems. The processing function 210 may also be coupled to a local area network transceiver 280 with associated antenna 281. Additional local or personal area network or mesh network transceivers may be included (not shown in FIG. 1). The local, personal, and mesh network transceivers may be for Wi-Fi, Bluetooth, Zigbee, NFC, or other local area networks, personal area networks, or local mesh networks that can provide member-to member data or voice communication connections between two or more WCDs without involving wide area network costs and overhead. The wide area RF modem 270 may offer a peer-to-peer capability, which is another form of member-to-member communication. The electronic device 205 has a power source (not shown in FIG. 2) that is a rechargeable battery in some embodiments. In some embodiments one or more of the radio transceivers themselves comprise one or more processors and memory, and may also comprise circuits that are unique to radio protocols defined by an industry standard. In some embodiments, the WCD 205 represents functions that are found within a fixed network of a wide area network system. In these embodiments, the WCD 205 may have a power source other than a battery, may lack member-to member wireless connection capability, may have very little human interface hardware, and the processing functions and transceiver functions may be within different equipment.

The functional block diagram 200 (FIG. 2) shows the executable operating instructions (EOI) 216 being stored in the memory 215, external to the processing function 210, but as noted above, the memory 215 may be within or shared with the one or more processing devices. The memory 215 also stores data 294. The EOI 216 of the electronic device 205 includes groups of instructions identified as an operating system (OS) 290, software applications 292 (including software utilities), and a software application called the connectivity management entity application (CMEA) 293. The applications 292 may include conventional human interface applications such as game applications, navigation application, video processing applications, transceiver interface, and sensor processing applications. The combination of the processing function 210, the EOI 216, and the data 294 may also be referred to as the processing system of the electronic device 205. The processing function 210 may include input/output (I/O) interface circuitry and/or may be coupled, as shown in FIG. 1, to separate I/O interface circuitry 220 that is controlled by the processing function 210. The I/O interface circuitry 220 provides for communications between the processing system and some hardware elements of the electronic device, including human interface components, such as keys, displays, and to wired I/O 221 such as that which uses standard hardware and software protocols Universal Serial Bus, 1394, or Ethernet). The processing system is coupled to the physical sensors 250 via the processing function 210. The physical sensors include at least a battery state of charge sensor that indicates a remaining charge in the main battery of the WCD. The processing system runs the CMEA 293, which controls issues commands and receives information using the transceivers in the WCD 205 to manage the wireless connections of other WCDs. Thus, the CME comprises the computer instructions of CMEA 293 and the hardware (e.g., the processing system and transceiver 270) to communicate with other WCDs. Portions of the CME may run on a server external to the WCD, such as a cloud server. The portions may include most of the functions of the CME. Some other applications 292 may be uniquely altered to provide certain functions cited below. For example, when the CME is in another WCD, the CME must be able to control the wireless connections of the WCD 205 and acquire metrics of the WCD 205, and therefore some transceiver interface applications of the applications 292 and/or operating instructions in one or more of the radio transceivers, such as WAN transceiver 270 and LAN transceiver 280 may be uniquely altered to carry out commands of the CME and collect metrics needed by the CME. The altered parts of applications 292 may be considered to be parts of the CME. The WCD 205 is capable of performing the functions described below with reference to FIGS. 3-14.

Figure 3:
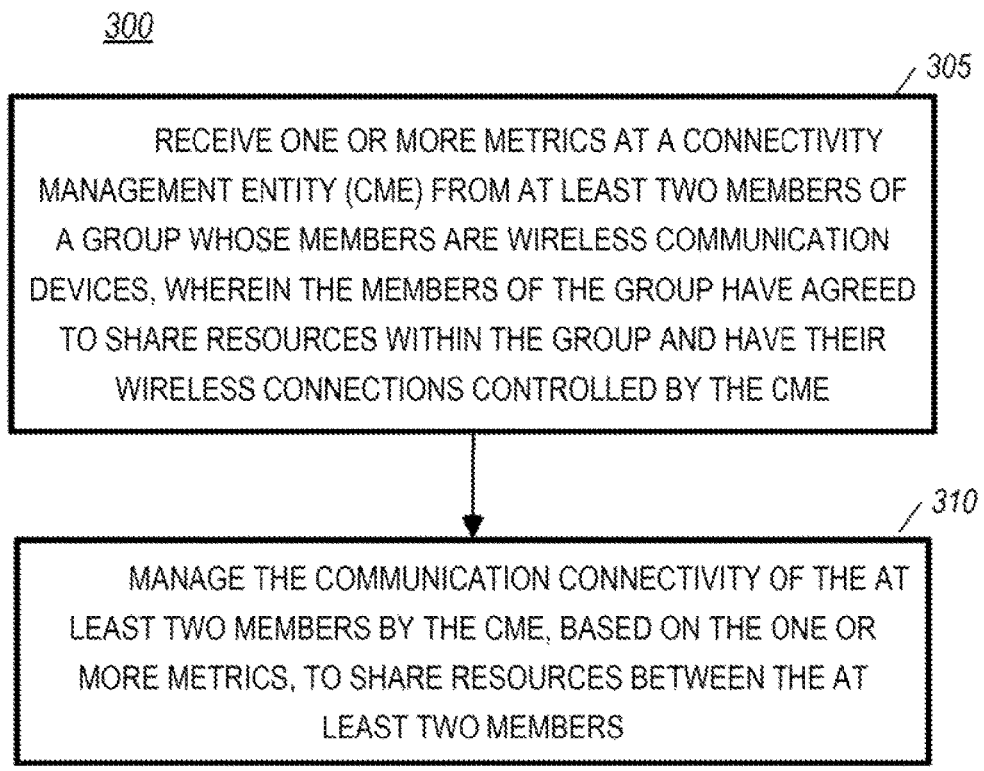
FIG. 3 is a flow chart that shows some steps of a method used by a connectivity management entity (CME), in accordance with certain embodiments.

Referring to FIG. 3, a flow chart 300 shows some steps of a method used by a connectivity management entity (CME), in accordance with certain embodiments. At step 305, one or more metrics are received by a connectivity management entity (CME). The metrics are from at least two of the members of a group whose members are wireless communication devices (WCDs). The members of the group have agreed to share resources within the group and have their wireless connections controlled by the CME. The CME manages, at step 310, the wireless connections of the at least two members, based on the one or more metrics, to share the resources between the at least two members. To share, in this context, means to increase or decrease the consumption of resources by at least two of the WCDs in a group, with an expectation of improved overall consumption of resources within the group. The CME may be resident within one of the at least two members. When a CME is resident in more than one WCD, the selection of the CME to be used for managing the group of WCDs may be made by user choice or by a user selecting a CME to make the choice using a CME selection routine of one CME that selects the managing CME by optimizing resources of the group. For example, power and/or memory metrics may be used to make the selection. It will be appreciated that some WCDs may not have the capability to include a CME (e.g., "dumb" phones), but could be members of the group and benefit from the resources sharing that can take place.

Figure 4:
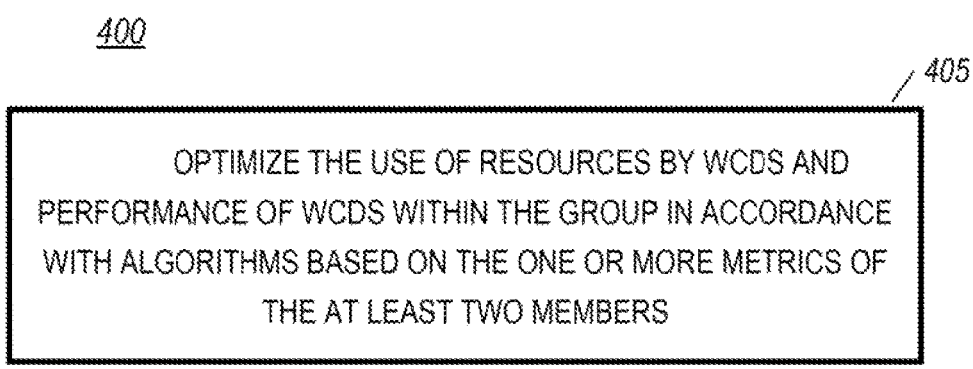
FIG. 4 is a flow chart that shows a step used in managing the wireless connections of the at least two members described with reference to FIG. 3, in accordance with certain embodiments.

Referring to FIG. 4, a flow chart 400 shows a step 405 of a method used by a connectivity management entity (CME), in accordance with certain embodiments. Step 405 is used in managing the wireless connections of the at least two members at step 310 of flow chart 300. Step 405 comprises optimizing the use of resources by WCDs and the performance of WCDs within the group in accordance with algorithms based on one or more metrics of at least the first and second members. For example, there may be a monetary cost for the use of the first network, such as a subscription cost based on traffic or a limited time lease cost. There may be no use cost for the member to member wireless connections. As another example, the use of the first network may use more power resources of the WCD than are used for the second member. The optimization algorithm may involve both resources, using machine learning, artificial intelligence techniques, and/or user prioritization to make WCD selection decisions based on the metrics.

Referring to FIG. 5, a flow chart 500 shows steps of a method used by a connectivity management entity (CME), in accordance with certain embodiments. The steps are used in managing the wireless connections of the at least two members at step 310 of flow chart 300. At step 505 a first internet access point of one or more available access points is selected by the CME for a first member of the group, The first internet access point is determined based on the metrics received from at least the first member and one other member. The first member of the group is directed at step 510 by the CME to make a wireless connection to the first internet access point. For example, the first network may be a wide area network or a local area network that provides internet connectability.

Referring to FIG. 6, a flow chart 600 shows a step 605 of a method used by a connectivity management entity (CME), in accordance with certain embodiments. Step 605 is used in step 510 (FIG. 5) of directing the first member to make a wireless connection. Step 605 comprises directing the first member to establish either a direct wireless connection between the first member and the internet access point or member-to member connection to a second member of the group that has an internet connection to the internet access point (via a direct wireless connection or indirect wireless connection to the internet access point. A direct wireless connection between a first and a second WCD is, for purposes of this document, a communication link from the first WCD to the second WCD through one wireless link. An indirect wireless connection between a first and a second WCD is, for purposes of this document, a communication link from a first WCD to a second WCD using more than one intervening wireless links. Thus, the first member may have internet connection either directly or by member-to-member wireless connections, e.g., Bluetooth, Wi-FI, Zigbee, peer-to-peer, etc. The first member may analyze download information and distribute the information to the second WCD when routing or other information associated with the download information indicates that the information is intended for the second member, or may route the information to the second member by default when there is no routing or other information associated with the download information. The first member may receive upload information from the second member and upload the information to a destination indicated by routing information associated with the upload information, or may add routing information based on other information from the second member, such as a default routing information for communications from the second member. The default routing information may be type specific for more than one type of information communicated from the second member to the first member.

Referring to FIG. 7, a flow chart 700 shows a step 705 of a method used by a connectivity management entity (CME), in accordance with certain embodiments. Step 705 is used in managing the wireless connections of the at least two members at step 310 of flow chart 300. Step 705 comprises directing at least two members to set up separate internet connections, wherein the information that is communicated over the separate internet connections is combined by one of the at least two members and used by at least one other member of the group for internet communications. This technique allows for two (or more) lower bandwidth wireless internet connections at one or two (or more) access points to be combined to provide higher bandwidth information, which may save cost for a WCD mobile device owner or for a wide area network provider. The inverse could also be done: separate a high bandwidth information stream into two or more narrower streams directed to two or more WCDs.

Referring to FIG. 8, a flow chart 800 shows steps of a method used by a connectivity management entity (CME), in accordance with certain embodiments. The steps are used in managing the wireless connections of the at least two members at step 310 of flow chart 300. At step 805, the CME determines that a new member has joined the group. The new member is directed by the CME at step 810 to measure metrics for wireless connections to one or more internet access points, based on the one or more metrics reported by the at least two members. The determination may be made by the new member detecting the CME based on identifications in CME directives to other members and sending a message to the WCD that is running the CME applications, or by the CME detecting communications that identify the member as one whose identification is stored in the CME, or by other known techniques.

Referring to FIG. 9, a flow chart 900 shows steps of a method used by a connectivity management entity (CME), in accordance with certain embodiments. The steps are used in managing the wireless connections of the at least two members at step 310 of flow chart 300. At step 905 the CME directs a first member to monitor a first access point for notifications for a second member issued by a first wireless network. The second member has connectivity to the first wireless network. The first wireless network may be a wide area network, for example a cellular network. The notifications may be of the paging type. The CME directs the second member to enter a low power state at step 910. The low power state may be, for example, a state in which the RF modem for the first wireless network of the second member is turned off. Then, when the first member detects a notification from the first wireless network for the second member, the second member is brought out of the low power state. The first member may direct the second member to come out of the low power state via member-to-member wireless communications, or the first member may notify the CME member and the CME may direct the second member to come out of the low power state via member-to-member wireless communications. The member-to-member communications with the second member are available to the second member in the low power state. The first wireless network may alternatively be Wi-FI and the second wireless network may be a personal network or a mesh network that use less power than the first wireless network.

Figure 10:
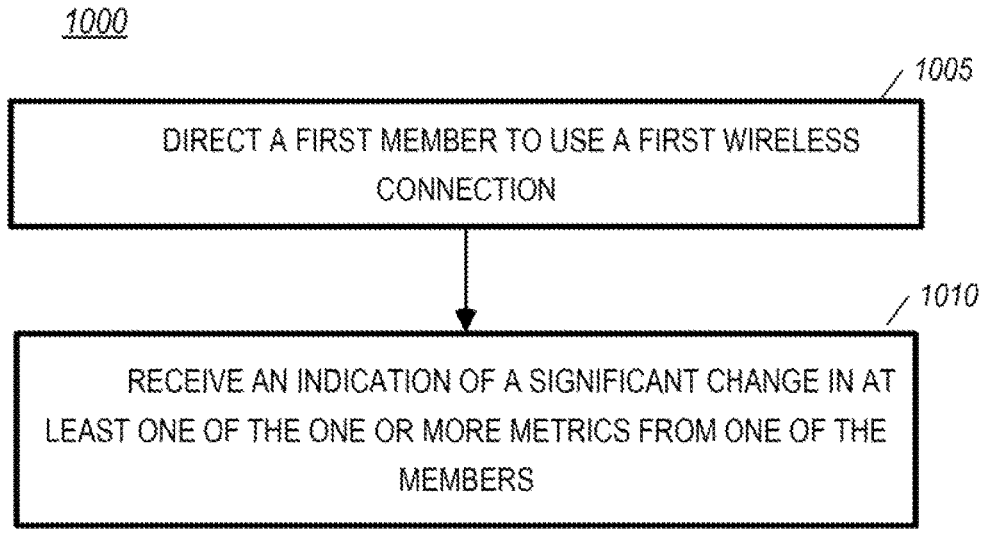

Referring to FIG. 10 a flow chart 1000 shows steps of a method used by a connectivity management entity (CME), in accordance with certain embodiments. The steps are used in managing the wireless connections of the at least two members at step 310 of flow chart 300. At step 1005 a first member is directed by the CME to use a first wireless connection. An indication of a significant change in at least one of the one or more metrics is received by the CME from one of the members at step 1010. At step 1015 the CME directs the first member to switch to a second wireless connection. A significant change in a metric may be, for example, a threshold value, such as an absolute value of a particular metric or a change factor (e.g., percentage or dB, such as 10%, 25%, 50% or 2 dB, 3 dB, 6 dB). These may be determined at the time of design and stored in the WCDs or stored by the CME or calculated by the CME depending on other metrics the CME has received from one or more members. The CME may communicate the values to the first member when the CME gives the direction.

Figure 11:
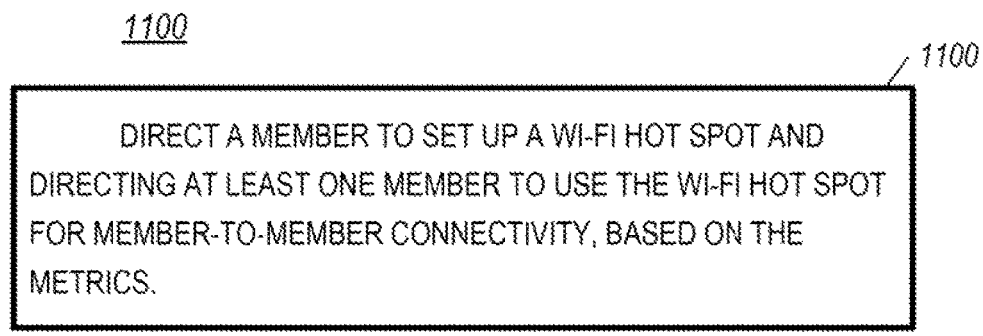

Referring to FIG. 11 a flow chart 1100 shows a step 1105 of a method used by a connectivity management entity (CME), in accordance with certain embodiments. Step 1105 is used in managing the wireless connections of the at least two members at step 310 of flow chart 300. Step 1105 comprises directing a member to set up a Wi-Fi hot spot and directing at least one member to use the Wi-Fi hot spot for member-to-member wireless connections. As described above in the example "Traffic Cost Optimization", the WCD in which the hot spot that is set up under this step may be used for member-to-member wireless connections. In the event that one (or more) of the WCDs in the group are a dumb phones, usage credentials for the hot spot could be manually set up in the dumb phones so that the dumb phones would acquire the hot spot when it is activated with those credentials, and use it for member-to member communications. Another WCD may be directed to use a leased Wi-Fi connection to obtain an internet connection for the group, while using a member-to-member wireless connection method other than Wi-Fi. The selection of which WCD provides the internet connection for the group may be an optimization result that is based on a combination of resource usages, such as cost, power, and/or memory. Memory may be involved in the selection when the WCD providing an internet connection for the group nears a limit on cache memory. It will be appreciated that a "dumb" phone may be able to advantageously use the benefits of the internet connection by using peer-to-peer connectivity.

Figure 12:
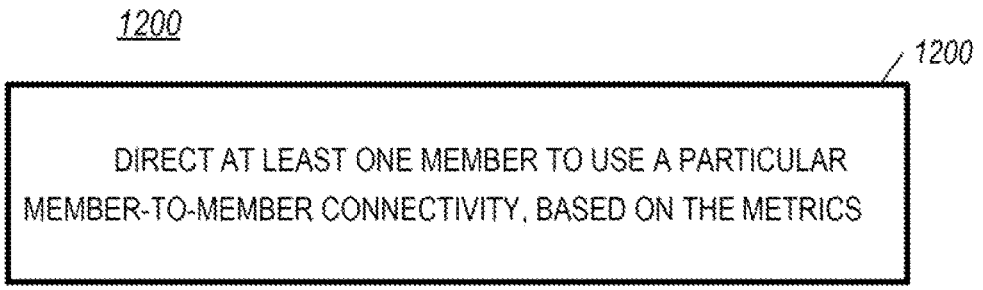

Referring to FIG. 12 a flow chart 1200 shows a step 1205 of a method used by a connectivity management entity (CME), in accordance with certain embodiments. Step 1205 is used in managing the wireless connections of the at least two members at step 310 of flow chart 300. At step 1205, at least one member is directed to use a particular member-to-member connection. The member-to-member connection may be a local area network, such as Wi-Fi, a mesh network, such as Zigbee, a personal area network, such as Bluetooth or NFC, or a peer-to-peer connection, such as LTE peer-to-peer. The member-to-member connection is selected based on the metrics. When the CME directs WCDs to use an identified Wi-Fi system for member-to-member wireless connection, the CME may select the Wi-Fi system to be identified based on metrics received from one or more members of the group. The system identification may, for example, include the channel to use and the password for the Wi-Fi system. Similarly, other member-to-member connections may have to be identified beyond their generic type.

Referring to FIG. 13 a flow chart 1300 a step 1305 of a method used by a connectivity management entity (CME), in accordance with certain embodiments. Step 1305 is used in managing the wireless connections of the at least two members at step 310 of flow chart 300. A first member of the group is directed by the CME to communicate voice information for a second member of the group using a wireless connection with a first communication network. The CME further directs the first member to communicate the voice information to at least the second member of the group using a member-to-member wireless connection. In one example, the first member is a member whose user has minutes of a voice plan that can be advantageously shared with the second member. For example, the second member has no minutes left on the plan of the second member's user and would have to pay at an expensive minute by minute basis.

Referring to FIG. 14 a flow chart 1400 shows a step 1405 of a method used by a wireless communication device (WCD), in accordance with certain embodiments. This describes a WCD that is controlled by the CME entity. At step 1405, a command is received from a connectivity management entity (CME) to communicate information between a network and the second WCD using a direct wireless connection to the network. The command also directs the first WCD to use one of a direct and an indirect wireless member-to-member connection to the second WCD that is identified by the command. The information has associated routing information that identifies one of the network and the second WCD (the network is identified in the routing for information from the second WCD and the second WCD is identified in the routing for information from the network). The information may be one of voice information and data information. The network may be, for example a wide area network such as a cellular or enterprise or Wi-Fi network having an internet connection. The member-to-member connection may be a Wi-Fi network, a Bluetooth network, a mesh network, or a peer-to-peer link used by a wide area RF modem.

At step 1010 the WCD the internet communications to one of an internal destination and the third WCD by using the identified member-to-member wireless connection in accordance with the routing information.

Reference throughout this document are made to "one embodiment", "certain embodiments", "an embodiment" or similar terms The appearances of such phrases or in various places throughout this specification are not necessarily all referring to the same embodiment. Furthermore, the particular features, structures, or characteristics attributed to any of the embodiments referred to herein may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The processes illustrated in this document, for example (but not limited to) the method steps described in FIGS. 3-14, may be performed using programmed instructions contained on a computer readable medium which may be read by processor of a CPU. A computer readable medium may be any tangible medium capable of storing instructions to be performed by a microprocessor. The medium may be one of or include one or more of a CD disc, DVD disc, magnetic or optical disc, tape, and silicon based removable or non-removable memory. The programming instructions may also be carried in the form of packetized or non-packetized wireline or wireless transmission signals.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or apparatuses described herein. Alternatively, some, most, or all of these functions could be implemented by a state machine that has no stored program instructions, or in one or more application specific integrated circuits (ASICs), in which each function or some combinations of certain of the functions are implemented as custom logic. Of course, a combination of the approaches could be used.

Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, specific embodiments have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of operating a connectivity management entity, comprising:
   receiving one or more metrics from at least two members of a group whose members are wireless communication devices, wherein the members of the group have agreed to share resources within the group and have their wireless connections controlled by the connectivity management entity;
   managing the wireless connections of at least two members, based on the one or more metrics, to share resources between the at least two members, comprising:
      selecting, for a first member, a first Internet access point of one or more Internet access points, wherein the first Internet access point is determined based on the metrics received from at least the first member and at least one other member; and
      directing the first member to make a wireless connection to the first Internet access point and set up an Internet connection.

2. The method of claim 1, wherein receiving one or more metrics comprises receiving at least one of the following metrics: communication resource needs, priorities, and limits of at least one of the members of the group; internal resource statuses of at least one of the members of the group; and communication link metrics acquired by at least one of the members of the group.

3. The method of claim 1, wherein managing the wireless connections of the at least two members further comprises:
   optimizing at least one of the use of resources by wireless communication devices and the performance of wireless communication devices within the group in accordance with algorithms based on the one or more metrics of the at least two members.

4. The method of claim 1 wherein directing the first member comprises:
   directing the first member to establish one of a direct wireless connection between the first member and the Internet access point and a member-to-member connection to a second member of the group that has an Internet connection to the Internet access point.

5. The method of claim 1, wherein managing the wireless connections of the at least two members comprises:
   directing at least two members to each establish a different Internet connection over wireless connections, wherein the information that is communicated over the different Internet connections is combined by one of the at least two members and used by at least one member of the group for Internet communications.

6. The method of claim 1, wherein managing the wireless connections of the at least two members comprises:
   determining that a new member has joined the group; and
   directing the new member to measure metrics for connections to one or more Internet access points, based on the one or more metrics reported by the at least two other members.

7. The method of claim 1 wherein managing the wireless connections of the at least two members comprises:
   directing the first member to monitor the first Internet access point for notifications for a second member, wherein the second member has connectivity to a wireless network; and
   directing the second member to enter a low power state.

8. The method of claim 1 wherein managing the wireless connections of the at least two members comprises:
   directing the first member to use a first wireless connection;
   receiving an indication of a significant change in at least one of the one or more metrics from one of the members; and
   directing the first member to switch to a second wireless connection.

9. The method of claim 1, wherein managing the connectivity of the at least two members comprises:
   directing a member to set up a Wi-Fi hot spot and directing at least one member to use the Wi-Fi hot spot for member-to-member connectivity, based on the metrics.

10. A method of claim 1, wherein managing the connectivity of the at least two members comprises:
    directing at least one member to use a particular member-to-member connectivity, based on the metrics.

11. The method according of claim 1, wherein managing the wireless connections of the at least two members further comprises:
    directing a first member of the group to communicate voice information for a second member of the group using a wireless connection with a first communication network and to communicate the voice information to at least the second member of the group using a member-to-member wireless connection.

12. A connectivity management entity, comprising:
    a transceiver,
    a processing system, operatively coupled to the transceiver,
    the processing system operative to:
       control the transceiver to receive one or more metrics from at least two members of a group whose members are wireless communication devices, wherein the members of the group have agreed to share resources within the group and have their wireless connections controlled by the connectivity management entity; and
       process the metrics to manage the wireless connections of the at least two members, based on the one or more metrics, to share resources between the at least two members;
       select, for a first member, a first Internet access point of one or more Internet access points, wherein the first Internet access point is determined based on the metrics received from at least the first member and at least one other member; and
       direct the first member to make a wireless connection to the first Internet access point and set up an Internet connection.

13. The connectivity management entity (CME) of claim 12, wherein the processing system is further operative to:

optimize the use of resources within the group in accordance with algorithms based on the one or more metrics of the at least two members.

14. The connectivity management entity (CME) of claim 12, wherein the processing system is further operative to:
   direct a first member to monitor the first Internet access point for notifications for a second member, wherein the second member has connectivity to a wireless network; and
   direct the second member to enter a low power state.

15. The connectivity management entity (CME) of claim 12, wherein the processing system is further operative to:
   direct the first member to use a first wireless connection;
   receive an indication of a significant change in at least one of the one or more metrics from one of the members; and
   direct the first member to switch to a second wireless connection.

16. The connectivity management entity (CME) of claim 12, wherein the processing system is further operative to:
   direct at least one member to use a particular member-to-member connectivity, based on the metrics.

17. The connectivity management entity (CME) of claim 12, wherein the processing system is further operative to:
   direct the first member of the group to communicate voice information for a second member of the group using a wireless connection with a first communication network and to communicate the voice information to at least the second member of the group using a member-to-member wireless connection.

18. A method of operating a connectivity management entity, comprising:
   receiving one or more metrics from at least two members of a group whose members are wireless communication devices, wherein the members of the group have agreed to share resources within the group and have their wireless connections controlled by the connectivity management entity; and
   managing the wireless connections of at least two members, based on the one or more metrics, to share resources between the at least two members, comprising directing the at least two members to each establish a different Internet connection over wireless connections, wherein the information that is communicated over the different Internet connections is combined by one of the at least two members and used by at least one member of the group for Internet communications.

19. A method of operating a connectivity management entity, comprising:
   receiving one or more metrics from at least two members of a group whose members are wireless communication devices, wherein the members of the group have agreed to share resources within the group and have their wireless connections controlled by the connectivity management entity;
   managing the wireless connections of at least two members, based on the one or more metrics, to share resources between the at least two members, comprising:
      determining that a new member has joined the group; and
      directing the new member to measure metrics for connections to one or more Internet access points, based on the one or more metrics reported by the at least two other members.

20. A method of operating a connectivity management entity, comprising:
   receiving one or more metrics from at least two members of a group whose members are wireless communication devices, wherein the members of the group have agreed to share resources within the group and have their wireless connections controlled by the connectivity management entity;
   managing the wireless connections of at least two members, based on the one or more metrics, to share resources between the at least two members, comprising:
      directing a first member to monitor a first access point for notifications for a second member, wherein the second member has connectivity to a wireless network; and
      directing the second member to enter a low power state.

21. A method of operating a connectivity management entity, comprising:
   receiving one or more metrics from at least two members of a group whose members are wireless communication devices, wherein the members of the group have agreed to share resources within the group and have their wireless connections controlled by the connectivity management entity;
   managing the wireless connections of at least two members, based on the one or more metrics, to share resources between the at least two members, comprising:
      directing a first member to use a first wireless connection;
      receiving an indication of a significant change in at least one of the one or more metrics from one of the members; and
      directing the first member to switch to a second wireless connection.

22. A connectivity management entity, comprising:
   a transceiver,
   a processing system, operatively coupled to the transceiver, the processing system operative to:
      control the transceiver to receive one or more metrics from at least two members of a group whose members are wireless communication devices, wherein the members of the group have agreed to share resources within the group and have their wireless connections controlled by the connectivity management entity; and
      process the metrics to manage the wireless connections of the at least two members, based on the one or more metrics, to share resources between the at least two members;
      direct a first member to monitor a first Internet access point for notifications for a second member, wherein the second member has connectivity to a wireless network; and
      direct the second member to enter a low power state.

23. A connectivity management entity, comprising:
   a transceiver,
   a processing system, operatively coupled to the transceiver, the processing system operative to:
      control the transceiver to receive one or more metrics from at least two members of a group whose members are wireless communication devices, wherein the members of the group have agreed to share resources within the group and have their wireless connections controlled by the connectivity management entity; and process the metrics to manage the wireless connections of the at least two members, based on the one or more metrics, to share resources between the at least two members;
direct a first member to use a first wireless connection;
receive an indication of a significant change in at least one of the one or more metrics from one of the members; and
direct the first member to switch to a second wireless connection.

* * * * *